Patented Jan. 31, 1939

2,145,695

UNITED STATES PATENT OFFICE 2,145,695

PROCESS FOR MANUFACTURING WATER SOLUBLE ARTIFICIAL RESINS FOR TREATING TEXTILES

Paolo Mattiotto, Milan, Italy

No Drawing. Application August 5, 1936, Serial No. 94,342. In Italy August 30, 1935

8 Claims. (Cl. 91—70)

Several processes are known for the preparation of water-soluble synthetic resins used in the textile industry for sizing several tissues to which, in addition to an increase in weight, they confer a special resistance to crumpling, due to the increased elasticity which is specially conspicuous in artificial silk tissues and yarns.

The present invention consists in the manufacture and subsequent application to the yarns and tissues consisting of vegetable fibres, natural and artificial, and of animal fibres, of a novel type of resin extremely soluble in water and perfectly stable. This resin has proved specially suitable in its applications to cellulosic tissues owing to its application facility which distinguishes this resin from other products and owing to the special softness to the touch which it confers to the yarn or tissue; this property has no parallel in the existing processes, all of which tend, to a greater or smaller extent, to harden the tissue, thus lowering the value of its general characteristics.

The resins forming the subject matter of the present invention are obtained from the condensation of formaldehyde or its derivatives with the glucose ureide, with or without addition of other substances which may or may not be adapted to form condensation products with the formaldehyde.

It is well known that glucose condenses in the aldehydic group with the urea in the presence of sulfuric acid, thus forming glucose ureide. The resulting product, after being purified, condenses in its turn in alkaline solution with the formaldehyde and forms a resin which is soluble in water and can be precipitated only by an acid. The resin thus obtained distinguishes itself from the well known urea-formaldehyde or phenol-formaldehyde resins by its perfect stability and by its absence of crystallization power. In their turn the urea-formaldehyde and phenol-formaldehyde resins become more stable and lose at least a portion of their crystallization power if they are additioned with the resin obtained from glucose ureide.

The tissues treated either with the resin obtained with the ureide or treated with this same resin augmented with urea-formaldehyde or phenol-formaldehyde resins maintain their softness unaltered while they materially increase in weight and possess, besides, an excellent resistance to crumpling if they are cellulosic tissues. The application is very simple: The tissue is passed between squeezing cylinders in a solution of said resins in the presence of a condensation catalyzer and then dried at 80–90° C. for 10 min. duration so as to complete the condensation of the resin. The resins thus condensed on the tissue are perfectly elastic and insoluble in water and cause the tissue to swell and to become almost no longer liable to crumpling.

To the mentioned treatment solutions, fat soluble substances may be added such as oils, sulfonated fat alcohols, pigments or dyeing stuffs in order to secure, according as may be desired, a greater elasticity, an eventual fixing of the pigments or a special colour. The resin, beside its application to the tissues, may be added to the spinning solution of the viscose artificial silk, the resulting yarn also possessing the properties mentioned above.

Example 1

120 parts glucose ureide are condensed with 300 parts 40% formaldehyde by volume, in the presence of caustic soda for a pH of 7.6–8 by heating. The resulting perfectly clear and liquid resin is dissolved in 580 parts of water. In this solution, and according to the method already described, a tissue of fluffy rayon is passed. After this operation the tissue is more swollen and heavier and practically not liable to crumpling.

Example 2

120 parts glucose ureide and 120 parts urea are condensed with 350 parts formaldehyde to the same pH 7.6–8 by heating. The resulting resin is perfectly soluble in water and distinguishes itself from the urea-formaldehyde by its stability, simplicity of application and by softness of touch which it preserves to the rayon tissue after the said treatment.

Example 3

120 parts glucose ureide are condensed with 250 parts formaldehyde to the same pH as above in the presence of 8 parts of sodium laurilsulfonate. In a 40% aqueous solution of the resulting resin is passed the artificial silk velvet. After completion of the operation, the resulting velvet is soft and practically not liable to bruising.

Example 4

To the viscose solution, 10% is added of a resin obtained according to the Examples 1, 2 and 3; the solution thus obtained is spun and the yarn produced is washed in a sodium acetate bath. The yarn is heated to 80° C. and after drying is repeatedly washed in cold water. The tissue prepared with the yarn thus treated possesses the above mentioned characteristics of not being liable to crumpling.

Having now particularly described and ascertained the nature of my said invention and in what manner the same is to be performed, I declare what I claim is:—

1. Process for loading textiles generally and particularly cellulosic textiles, and rendering the same insensitive to drops of water as well as resistant to crumpling and bruising, which process consists in treating the textiles with a water soluble, semi-condensed resin, obtained by combining glucose ureide with a sufficient amount of formaldehyde to react therewith in the presence of a free alkali, and then definitely condensing the resin applied to said textiles by means of heat.

2. Process for loading textiles generally and particularly cellulosic textiles rendering the same insensitive to drops of water as well as resistant to crumpling and bruising, which process consists in first applying to the textiles a water soluble semi-condensed resin obtained by combining glucose ureide and phenol with a sufficient amount of formaldehyde to react therewith in the presence of free alkali, and then definitely condensing the resin applied to said textiles by means of heat.

3. Process for loading textiles generally and particularly cellulosic textiles rendering the same insensitive to drops of water as well as resistant to crumpling and bruising, which process consists in first applying to the textiles a water soluble semi-condensed resin obtained by combining glucose ureide and urea with a sufficient amount of formaldehyde to react therewith in the presence of a free alkali, and then definitely condensing the resin applied to said textiles by means of heat.

4. Process according to claim 1, wherein a catalyst is added prior to the treatment of the textiles which is capable of accelerating the complete condensation of the resins upon said textiles by the simultaneous application of heat.

5. Process according to claim 2, wherein a catalyst is added prior to the treatment of the textiles which is capable of accelerating the complete condensation of the resins upon said textiles by the simultaneous application of heat.

6. Process according to claim 3, wherein a catalyst is added prior to the treatment of the textiles which is capable of accelerating the complete condensation of the resins upon said textiles by the simultaneous application of heat.

7. Process according to claim 1, wherein phenol and sulfonated fat alcohol are added to the glucose ureide and a catalyst is added prior to the treatment of the textiles which is capable of accelerating the complete condensation of the resins upon said textiles by the simultaneous application of heat.

8. Process according to claim 1, wherein urea and sulfonated fat alcohol are added to the glucose ureide and a catalyst is added prior to the treatment of the textiles which is capable of accelerating the complete condensation of the resins upon said textiles by the simultaneous application of heat.

PAOLO MATTIOTTO.